Patented Mar. 24, 1942

2,277,180

UNITED STATES PATENT OFFICE 2,277,180

ALKYLENE DIAMINE ALKYL MERCURY COMPOUNDS

Fritz Wolff, Berlin-Pankow, Karl Görnitz, Teltow-Seehof, and Willy Harnack, Berlin-Friedrichshafen, Germany, assignors to Sherka Chemical Co. Inc., Bloomfield, N. J., a corporation of New York No Drawing. Application August 6, 1938, Serial No. 223,450. In Germany August 7, 1937

3 Claims. (Cl. 260—431)

This invention relates to alkylene diamine addition products with organic mercury compounds.

Attempts have already been made to employ as seed grain immunising agents alkyl mercury compounds of the formula R.Hg.X in which R is an aliphatic hydro-carbon residue and X a negative ion residue. Klages (Zeitschrift für angewandte Chemie, 1927, 559) has by exhaustive experiments established that these compounds injure the capacity for germination with the formation of abnormally thickened shoots to such an extent that they are not applicable as immunising agents, although, as Gassner had already shown they have an outstanding effect against smut spores (Arbeiten der Biologischen Reichsanstalt, 1923, vol. 11, page 380). They were therefore in German Patent No. 515,957 only protected as dry immunising agents. Gassner also referred to the fact that these compounds on account of their volatility have an injurious effect on human beings. In fact for example ethyl-mercury chloride, as stated by Whitemore in "Organic Compounds of Mercury," 1921, page 97, sublimes as low as 40° C. A further disadvantage is lack of water solubility which practically excludes the use of these compounds in wet immunising processes.

In accordance with the present invention by the action of alkylene diamines on compounds of the formula R.Hg.X in a manner analogous to the process for the manufacture of alkylene diamine mercury salt complex compounds of German Patent No. 125,095, new complex compounds are produced which are easily soluble in water. They are, therefore, not only applicable in the dry immunising process but primarily in the wet immunising process, in particular in the short wet immunising process which requires higher concentrations. In contradistinction to the alkyl mercury compounds as are described in the work of Klages and also in German Patent No. 515,957, by the new complex compounds injury to the germinating capacity of the seed grain is also avoided in the wet immunising process. A further advantage consists in that compared with the known compounds they have a low vapour pressure. They do not sublime so that the danger of breathing in poisonous vapours does not exist.

The new alkylene diamine alkyl mercury compounds are suitably obtained by reaction of the alkyl mercury compounds with alkylene diamines in solvents in which both substances are soluble, suitably in alcohols, for example in methyl alcohol. The reaction is advantageously carried out in the hot. By this means smaller quantities of solvents are employed so that on cooling the reaction product crystallises out.

The following example illustrates the production of the compounds employed according to the invention:

EXAMPLE 132 grams of ethyl mercury chloride are dissolved in a mixture of 60 grams of ethylene diamine and 500 ccs. of absolute methyl alcohol at 50–60° C. filtered hot and cooled to 0° C., whereby a complex compound of melting point 156° C. crystallises out.

The complex compounds are also formed in other suitable solvents, for example in water.

From the following field and hot-house tests the particular suitability of these new compounds in the wet and dry immunising processes is clearly seen:

Experimental Series I

The wet immunising agent employed for the following experiments contains the fungicide chloro-mercury-ethyl-ethylene diamine which has been made up with sodium sulphate and sodium carbonate to 2% Hg (referred to below for the sake of brevity as "N").

When employed as dry immunising agent the agent employed contains 0.7% Hg as chloromercury ethyl-ethylene diamine. For the manufacture thereof the fungicide is previously dissolved in alcohol, then talcum as carrier substance is impregnated with this solution, dried and sieved (referred to below for brevity as "T"). The comparison agents are officially recommended commercial preparations:

I. Against smut of wheat (spore germination)

(a) In the dry immunising process.

100 GRAMS OF AGENT TO 100 KG. OF SEED GRAIN

|  | 5 days | 7 days | 10 days |
|---|---|---|---|
| Control | +++ | +++ | +++ |
| Comparison agent (1.5% Hg) | +3 | +3 | +3 |
| T (0.7% Hg) | — | —— | — |

In the above table the numbers after a cross, for example +3, indicate the number of germinated spores, ++ indicates average germination of the spores, +++ strong germination of the spores, — indicates no germination of the spores.

150 GRAMS OF AGENT TO 100 KG. OF SEED GRAIN

|  | 5 days | 7 days | 10 days |
|---|---|---|---|
| Control | +++ | +++ | +++ |
| Comparison agent (1.5% Hg) | − | − | − |
| T (0.7% Hg) | − | − | − |

(b) In the wet immunising process

|  | Concentration | Process | Residual attack |
|---|---|---|---|
|  | Per cent |  | Per cent |
| Control |  |  | 19.7 |
| Comparison agent (3.5% Hg) | 0.1 | Immersion | 0.5 |
| N (2% Hg) | 0.06 | ...do... | 0 |
| Comparison agent (3.5% Hg) | 0.5 | Wetting | 0 |
| Do | 0.3 | ...do... | 0.5 |
| N (2% Hg) | 0.3 | ...do... | 0 |

Testing of germination

|  | Concentration | Process | Germination, per cent | |
|---|---|---|---|---|
|  |  |  | 4 days | 10 days |
| Control |  |  | 95.5 | 98.5 |
| N (2% Hg) | 0.125 | Immersion | 97.5 | 99.0 |
| N (2% Hg) | 0.5 | Wetting | 97.0 | 98.0 |
| N (2% Hg) | 2.0 | Short wet process | 96.7 | 97.5 |

Superiority of the present compounds is exhibited in the treatment of grain against fusarium in the dry, immersion, wetting and the short wet immunising processes. They have been found eminently suitable against the smut of oats and against stripe disease.

The low dosis curativa of these compounds is noteworthy since it renders possible the manufacture of wet and dry imunising agents with very low mercury content and without danger of injuring the germ. As shown in the above tables the mercury content in the case of wet immunising agents is 2% and in the case of dry immunising agents 0.7%.

A further advantage which is attained by these new compounds consists in the possibility of application both in wet and dry immunising processes as so called combination immunising agents, whereby the quantity expended for the dry immunising process can be considerably reduced.

As combination immunising agent was employed an immunising agent adjusted to 2% Hg the carrier substance of which consisted of finely ground calcined sodium carbonate.

The new compounds in contradistinction to all known mercury compounds are even effective in the wetting process in the case of oats.

Instead of the ethylene diamine ethyl-mercury compounds here set forth by way of example also other compounds of this series e. g. chloro-mercury-ethyl-ethylene diamine of the formula $(Cl.Hg.C_2H_5)_2.(NH_2.CH_2.CH_2.NH_2)$ hydroxydo-mercury-methyl-ethylene diamine $(HO.Hg.CH_3)_2.(NH_2.CH_2.CH_2.NH_2)$ bromido-mercury-propyl-ethylene diamine $(Br.Hg.CH_2.CH_2.CH_3)_2.(NH_2.CH_2.CH_2.NH_2)$ nitrato-mercury-isoamyl-ethylene diamine $(O_3N.Hg.CH_2.CH_2.CH(CH_3)_2)_2.(NH_2.CH_2.CH_2.NH)$ chloro-mercury-ethyl-ethylene diamine $(Cl.Hg.C_2H_5)_3.(NH_2.CH_2.CH_2.NH_2)_2$ and similar ones are applicable although as is known the effects of other members of a homologous series vary within certain limits.

What we claim is:

1. The compound of the formula:

$(Cl.Hg.C_2H_5)_3.(NH_2.CH_2.CH_2.NH_2)_2.$

2. The compound of the formula:

$(Cl.Hg.C_2H_5)_2.(NH_2.CH_2.CH_2.NH_2).$

3. The compounds of the formula:

$(Cl.Hg.C_2H_5)_x.(NH_2.CH_2.CH_2.NH_2)_y$ wherein $x$ is a whole number from 2 to 3 and $y$ is from 1 to 2.

FRITZ WOLFF.
KARL GÖRNITZ.
WILLY HARNACK.